(12) United States Patent
Marupaduga

(10) Patent No.: US 11,147,032 B1
(45) Date of Patent: Oct. 12, 2021

(54) SYSTEM AND METHODS FOR DYNAMIC SYNCHRONIZATION SIGNAL BLOCK PERIODICITY MODIFICATIONS

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 26 days.

(21) Appl. No.: 16/830,958

(22) Filed: Mar. 26, 2020

(51) Int. Cl.
| | | |
|---|---|---|
| *H04B 17/309* | (2015.01) | |
| *H04B 7/0408* | (2017.01) | |
| *H04W 24/08* | (2009.01) | |
| *H04W 56/00* | (2009.01) | |
| *H04W 76/18* | (2018.01) | |
| *H04W 76/15* | (2018.01) | |
| *H04W 8/24* | (2009.01) | |

(52) U.S. Cl.
CPC .......... *H04W 56/001* (2013.01); *H04W 8/24* (2013.01); *H04W 24/08* (2013.01); *H04W 76/15* (2018.02); *H04W 76/18* (2018.02)

(58) Field of Classification Search
None
See application file for complete search history.

(56) References Cited

U.S. PATENT DOCUMENTS

| | | | | |
|---|---|---|---|---|
| 2018/0132168 | A1* | 5/2018 | Ingale | H04W 48/12 |
| 2019/0053072 | A1* | 2/2019 | Kundargi | H04W 16/28 |
| 2020/0028603 | A1* | 1/2020 | Wang | H04L 5/0051 |
| 2020/0068513 | A1* | 2/2020 | Takeda | H04W 56/0045 |
| 2020/0304218 | A1* | 9/2020 | Gao | H04B 17/318 |
| 2021/0068162 | A1* | 3/2021 | Agiwal | H04W 56/001 |

OTHER PUBLICATIONS

Prateek Mishra, "Understanding NR5G Synchronisation Signal Block (SSB)", Web page <https://medium.com/@mishra.eric/understanding-nr5g-synchronisation-signal-block-ssb-7a8d56a48e16>, 5 pages, Dec. 22, 2018.

* cited by examiner

*Primary Examiner* — Gary Lafontant

(57) ABSTRACT

A method, system, and medium are provided for optimizing a user experience based on periodicity modifications. In embodiments, when a large volume of UE are located in a particular sector of a cell site, the periodicity of a synchronization block transmitted from a base station may be adjusted in order to change a rate or speed of on-loading user equipment at the cell site. In some embodiments, by shortening the periodicity of a synchronization block, user equipment may be more quickly on-loaded to a wireless network at the cell site.

20 Claims, 7 Drawing Sheets

SYSTEM AND METHODS FOR DYNAMIC SYNCHRONIZATION SIGNAL BLOCK PERIODICITY MODIFICATIONS

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, an antenna array may be partitioned such that different elements in the antenna array may operate using different technologies. In some embodiments, this virtual configuration refers to the antenna array operating in a dual technology mode, or Evolved-Universal Terrestrial Radio Access-New Radio Dual Connectivity ("EN-DC") mode, based on a radio controlling the antenna array. When operating in the dual technology mode, an antenna array may concurrently connect to and communicate with user equipment (UE) using at least two distinct access technologies. For example, when operating in the dual technology mode, the radio and antenna array of the base station may support a concurrent connection to UE capable of 5G and legacy UE that only supports non-5G technologies. Further, when operating in the dual technology mode, the radio and antenna array of the base station may concurrently provide service for Long Term Evolution (LTE) Evolved Node B (eNodeB) and 5th Generation (5G) Next Generation Node B (gNodeB) access technologies in a telecommunications network.

In some embodiments, the antenna elements in the antenna array may be managed and adjusted for each of the two or more access technologies by the radio of the base station. For example, one group of antenna elements associated with a first access technology may be adjusted independently from another group of antenna elements associated with a different access technology within the same antenna array. In this way, the radio and antenna array operating in the dual technology mode may implement changes for a first access technology independent of the operations of the second access technology.

For example, the periodicity of a signal synchronization block that is transmitted using one or more antenna elements that are dedicated to the first access technology may be changed. The change in the periodicity of a signal synchronization block that is transmitted using one or more antenna elements that are dedicated to the first access technology may be used to change a timing, rate, or "speed" at which UE are able to "on board" or connect to the first access technology, thereby reducing the occurrence of synchronization failures experienced by UE.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
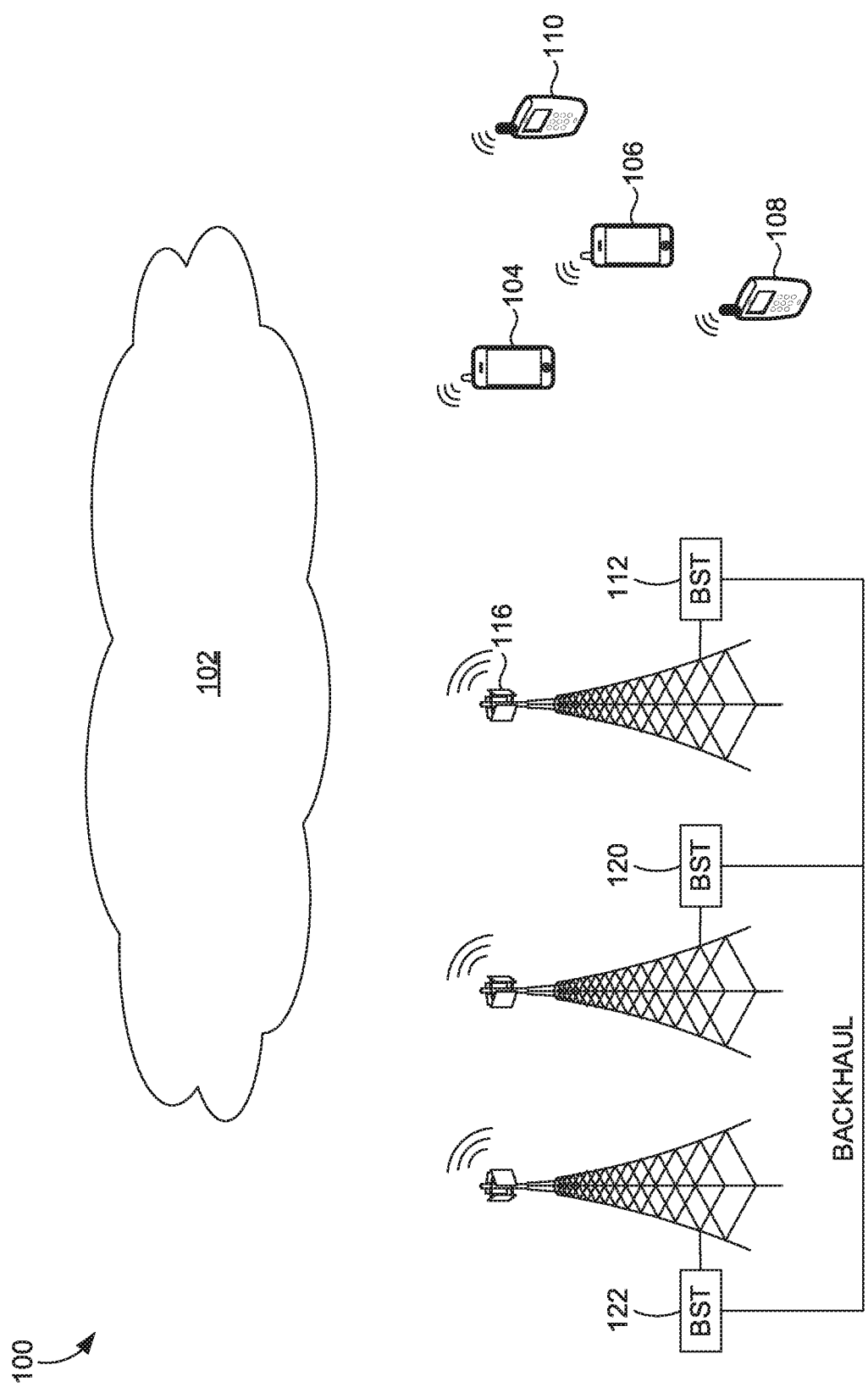
FIG. 1 depicts an example of a network environment in accordance with one or more embodiments.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
AAU Active Antenna Unit
BRS Broadband Radio Service
CD-ROM Compact Disk Read Only Memory
CDMA Code Division Multiple Access
EIRP Equivalent Isotropically Radiated Power
eNodeB Evolved Node B
EVDO Evolution-Data Optimized
GIS Geographic/Geographical/Geospatial Information System
gNB Next Generation Node B
gNB CU Next Generation Node B Central Unit
gNB DU Next Generation Node B Distribution Unit
GPRS General Packet Radio Service
GSM Global System for Mobile communications
iDEN Integrated Digital Enhanced Network
DVD Digital Versatile Discs
EEPROM Electrically Erasable Programmable Read Only Memory
FD-MIMO Full Dimension Multiple-Input Multiple-Output
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
RAM Random Access Memory
RET Remote Electrical Tilt
RF Radio-Frequency
RFI Radio-Frequency Interference
RLF Radio Link Failure
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SINR Signal-to-Interference-Plus-Noise Ratio
SNR Transmission-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications
    System
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 700 shown in FIG. 7. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," "mobile device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "dual technology" is used herein to indicate that at least two distinct technologies are available for concurrent utilization, for example, by a radio and corresponding antenna array. However, it will be understood from this discussion herein that radios that are capable of operating with more than two technologies are also contemplated to be within the scope of the invention and the term "dual" is not to be construed as specifically limiting the embodiments of the invention.

The term "mMIMO" may refer to one or more high element capacity antenna configurations, such as Full Dimension or Massive Multiple-Input Multiple-Output antenna configurations (interchangeably referred to as "FD MIMO" or "mMIMO"). In embodiments, mMIMO antenna arrays have a plurality of transmitting and receiving antenna elements that are, generally, physically arranged in a compact and high number configuration. In embodiments, the compact and dense configuration of the plurality of antenna elements within a single antenna may increase wireless network performance and throughput compared to prior, non-compact and/or low density antenna elements. For example of scale, a mMIMO antenna array may have approximately 64 to 128 individual antenna elements, though this is only an example and is not to be construed as limiting the number of antenna elements in any array. Additionally, for example, a mMIMO antenna array may generate a beam having a narrower beam width relative to a non-MIMO antenna array.

The term "synchronization signal" generally refers to a synchronization signal block ("SS Block" or "SSB") within a transmission sent by an antenna element, antenna array, or antenna at a cell site, as controlled by a base station. In some embodiments, the synchronization signal is an NR-5G specific SSB. The terms "synchronization signal," "SS block," and "SSB" may be used interchangeably herein. An "SSB Burst" refers to a set of synchronization signal blocks. Generally, a single transmission may include multiple synchronization signals that are evenly and consistently repeated within a timeframe. For example, a synchronization signal may consistently reoccur (i.e., repeat) every n number of frames, half-frames, sub-frames, slots, or symbols (e.g., n being a whole integer or a pattern of integers). For example, a synchronization signal may consistently and evenly reoccur for a time interval such as every 10 milliseconds. In another example, a synchronization signal may reoccur in a repeating pattern (e.g., occurs at a first time interval of 10 milliseconds, then occurs at a second time interval 20 milliseconds, and then occurs at a third time interval 15 milliseconds, before the pattern begins again at the first time interval of 10 milliseconds). Additionally or alternatively, a synchronization signal may consistently reoccur (i.e., repeat) every n number of resource blocks (e.g., n being a whole integer). The time interval of the synchronization signal (i.e., a duration of time between repeating synchronization signals), whether a fixed integer n of repeating occurrences or a complex pattern of occurrences, may generally be referred to as "periodicity" hereinafter.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Overview

Generally, antenna arrays are located at a cell site that is controlled by a base station. An antenna array may transmit and/or receive signals using one or more access technologies. For example, an antenna array may be configured with software that controls the hardware components and operation of the antenna array such that the antenna array operates using a 4G and/or 5G access technologies. In embodiments, an antenna array may be virtually partitioned into two or more distinct portions of antenna elements that utilize distinct access technologies (i.e., "dual technology" mode). In embodiments, an antenna array is virtually partitioned such that a first portion of individual antenna elements operate using a first access technology and a second portion of individual antenna elements operate using a second access technology. In various embodiments, the antenna elements of the first and second portions may be controlled independent of each other. For example, the content, type, rate, strength, and/or periodicity of transmissions, such as synchronization signals, of the first portion of antenna elements may be changed independent of the functions of the second portion of antenna elements. Further, each antenna element may be individually controlled, in some embodiments.

In embodiments, the periodicity of synchronization signals and/or rate of repeated synchronization signals in one or more transmissions originating from the first portion of antenna elements dedicated to the first access technology may be modified, independent of the second portion of antenna elements, in order to optimize service for UE by increasing the speed by which UE can connect to the network using the first access technology. Embodiments herein provide methods, systems, and computer-readable media that adjust, modify, change, and/or customize the periodicity of synchronization signals that are transmitted from an antenna at a cell site that is controlled by a base station. The embodiments herein can improve the speed by which one or more UE are able to connect to a network using the first access technology. For example, by shortening the periodicity of synchronization signals, the synchronization signals are repeatedly transmitted more often (e.g., increased frequency) within a defined period of time, an increased number of synchronization signals are thus produced that may be detected by one or more UE and used by one or more UE to connect to the network using the first access technology. By increasing the repeating of the synchronization signals (i.e., shortening the time interval or duration of time that lapses between synchronization signal transmissions), a base station provides one or more UE an increased number of opportunities and/or more frequent opportunities to detect the synchronization signals. Based on the increased number of opportunities and/or more frequent opportunities available for detection of synchronization signals, the UE may more quickly connect to the network using the first access technology. In embodiments, the periodicity is used to define the subcarrier spacing and slot/symbol location(s) of repeated synchronization signals, such as an SS block. For example, the periodicity may be used to define the subcarrier spacing and slot/symbol location(s) of a set of repeated SS blocks that together form an SSB Burst.

The embodiments herein may adjust, modify, change, and/or customize the periodicity of synchronization signals that are transmitted from an antenna at a cell site that is controlled by a base station based on, in response to, and/or as triggered by an event, such as the occurrence and/or reporting of radio link failures (RLFs). In some embodiments, the RLFs are associated with, specific to, caused by, and/or result from one or more UE failing to detect one or more synchronization signals that have been transmitted at the cell site. The quantity of RLFs occurring may be determined by the base station in near real-time and/or periodically, in embodiments. Further, the base station may determine whether the quantity of RLFs meets, exceeds, or is within a percentage or numeric range of a predefined threshold, in some embodiments.

In one embodiment, the periodicity used when transmitting one or more synchronization signals may be adjusted by the base station, based on, triggered by, and/or in response to the determination that the quantity of RLFs for UE meets, exceeds, or is within a percentage or numeric range of a predefined threshold. In some embodiments, the periodicity of synchronization signals may be adjusted based on such a determination, wherein the RLFs are specific to synchronization signal detection failures for one or more UE that utilize the first access technology, such as UE that are capable of using 5G technology. The RLFs that correspond to synchronization signal detection failures of UE may be associated with an existing, current, and/or default periodicity, in embodiments.

In order to adjust the existing, current, and/or default periodicity that is associated with RLFs that meet the predefined threshold, a new value to be used for the periodicity is determined, in embodiments. Embodiments herein may determine a new periodicity (i.e., an integer value, such as n, specifying a time unit, such as milliseconds) to implement in place of the current periodicity. In embodiments, relative to the current periodicity, the new periodicity values may be less than (i.e., shortened periodicity provides increased rate of occurrence within a time period) than the existing, current, and/or default periodicity. The periodicity may be adjusted by shortening the time interval of the periodicity, in some embodiments. For example, synchronization signals may be transmitted at a periodicity of one SS block every 20 milliseconds. When RLFs that correspond to SS block detection failures meet or exceed a predefined threshold, the periodicity may be changed so that SS blocks that were being transmitted every 20 milliseconds (i.e., a first periodicity) are to be transmitted every 15 milliseconds (i.e., a second periodicity), for example. Based on the adjustment, one SS block is subsequently transmitted every 15 milliseconds from the antenna array, in this example. In another example, when RLFs that correspond to SS block detection failures meet or exceed the predefined threshold, the periodicity of the SS blocks may be changed from 20 milliseconds to 10 milliseconds. One SS block can be subsequently transmitted every 10 milliseconds, in such an example.

In various embodiments, the new or "second" periodicity may be identified, determined, and/or selected via a processor of the base station based on existing, current, and/or historical loading measurements associated with, measured by, and/or as monitored at the antenna array. The existing, current, and/or historical loading measurements of the antenna array may specifically indicate loading values for UE that are/have been connected via the first access technology at the same antenna array, a similar antenna array, and/or the same or similar cell site(s). For example, the base station controlling the antenna array may measure the current loading at the antenna array for UE connected to the first access technology and/or may reference a historical loading at the antenna array for UE connected to the first access technology. The base station may use the historical loading measurements to identify that the second periodicity should be 10 milliseconds, for example, as opposed to 15 milliseconds. In some embodiments, the base station may disregard the loading of UE that are using the second access technology.

Subsequent to adjusting, modifying, changing, and/or customizing the periodicity of synchronization signals that are transmitted based on, in response to, and/or as triggered by an event such as one or more RLFs occurring and meeting a threshold, a base station may monitor subsequent events such as RLFs, in some embodiments. In embodiments, the RLFs occurring after the periodicity adjustment may be determined to meet, exceed, or be within a percentage or numeric range of a predefined threshold, and then the periodicity of the synchronization signals may be adjusted further, as described hereinafter.

In one embodiment, a method is provided for optimizing a user experience based on periodicity modifications. In embodiments, one or more synchronization signals are transmitted using a first periodicity. A quantity of synchronization signal detection failures are determined to meet a threshold, in an embodiment. In some embodiments, a second periodicity that is different from the first periodicity is determined. In response to determining that the quantity of synchronization signal detection failures meets the threshold, one or more additional synchronization signals are subsequently transmitted using the second periodicity.

In another embodiment, computer-readable storage media having computer-executable instructions embodied thereon are provided for execution by one or more processors. In embodiments, the execution of the instruction causes a first plurality of synchronization signals to be transmitted using a first periodicity. The plurality of synchronization signals are configured for receipt by one or more UE that are capable of using a first access technology, in embodiments. In some embodiments, a first quantity of synchronization signal detection failures are determined to meet a threshold based on the first plurality of synchronization signals transmitted. A second periodicity may be determined, in embodiments, based on a total quantity of the one or more UE that are capable of using the first access technology. In some embodiments, the second periodicity is a repeatable time interval that is shorter in duration than the first periodicity.

A second plurality of synchronization signals may be transmitted using the second periodicity, in an embodiment. A second quantity of synchronization signal detection failures are monitored based on the second plurality of synchronization signals transmitted, in various embodiments.

Embodiments herein comprise a system of one or more hardware processors. In embodiments, the system transmits a first plurality of synchronization signals using a first periodicity, the plurality of synchronization signals for receipt by one or more UE that are capable of using a first access technology. A first quantity of synchronization signal detection failures are determined to meet a threshold based on the first plurality of synchronization signals transmitted, in some embodiments. In an embodiment, a second periodicity is determined based on a total quantity of the one or more UE that are capable of using the first access technology, wherein the second periodicity is a repeatable time interval that is shorter in duration than the first periodicity. A second plurality of synchronization signals is transmitted using the second periodicity, in some embodiments. A second quantity of synchronization signal detection failures is determined based on the second plurality of synchronization signals transmitted.

Systems

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and thus may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit (MMU) for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE, and/or RLFs that occur at the base station, dynamically and/or as stored in a data store.

The base station 112 may use a radio that is connected to the antenna array 116 by a physical RF path, where the radio is used to cause the antenna array 116 to transmit radio-frequency signals using the plurality of antenna elements.

Figure 2:
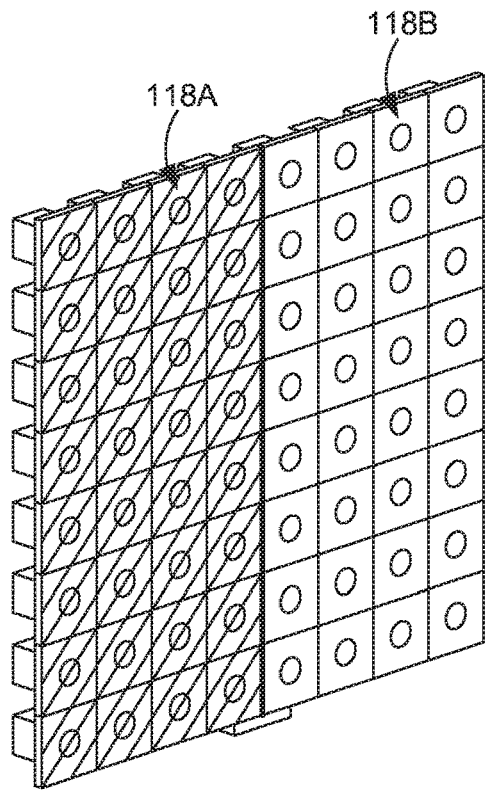
FIG. 2 depicts various first and second access technology antenna elements partitioned within an antenna array in accordance with one or more embodiments.
Figure 2:
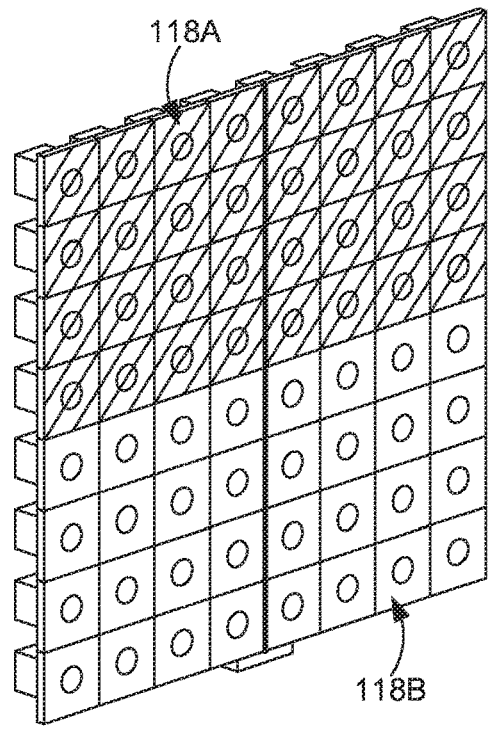
Figure 2:
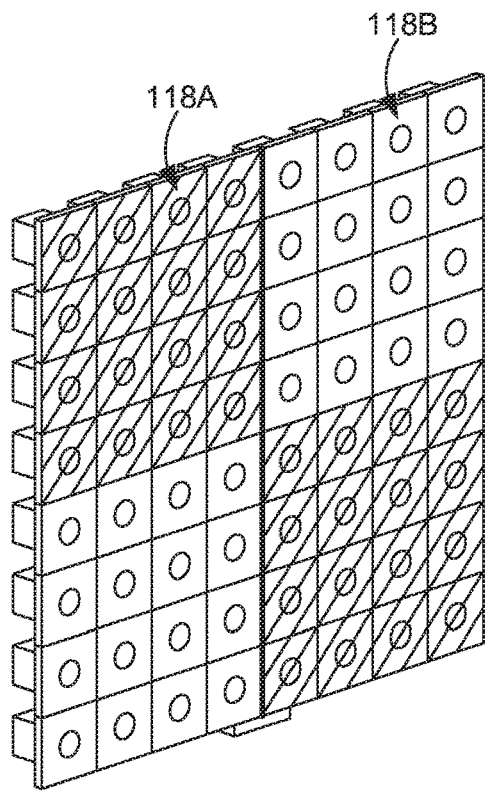
Figure 2:
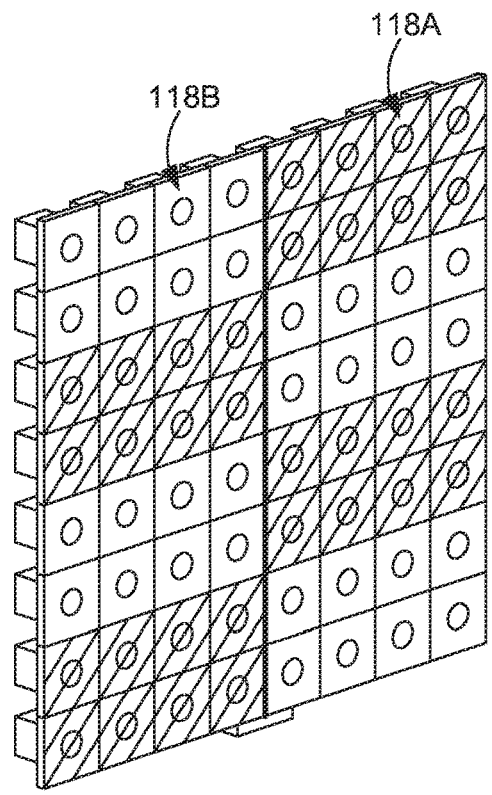

The plurality of antenna elements in the antenna array 116 may include a first portion of antenna elements 118A and a second portion of antenna elements 118B, shown in FIG. 2. In embodiments, the plurality of antenna elements of the antenna array 116 may be partitioned such that a first portion of antenna elements 118A may be associated with, dedicated to, correspond to, and/or be configured to operate using a first access technology, and a second portion of antenna elements 118B may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 116 operates in a dual technology mode.

In some embodiments, the antenna array 116 is partitioned such that the first portion of antenna elements 118A is associated with the first access technology and the second portion of antenna elements 118B is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements 118A may operate using 5G wireless access technology and the second portion of antenna elements 118B may operate using 4G wireless access technology. As illustrated in FIG. 2, for example, the plurality of antenna elements may be apportioned or virtually partitioned into the first and second portions 118A and 118B using a variety of configurations, and the embodiments herein are not limited to only those apportionments depicted, nor are the embodiments herein limited to balanced-array apportionments or specific ratios between various portions of the antenna array. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements 118A may communicate with current UE 104 and 106 using 5G technology and the second portion of the antenna elements 118B may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an Evolved Node B (i.e., "eNodeB" or "eNB") and a Next Generation Node B (i.e., "gNodeB" or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, radio frequency conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements 118A may be controlled and adjusted as a group by the base station 112 using a controller, such as an MMU, independent of the second portion of antenna elements 118B. In a similar fashion, the operations, configurations, and/or settings of the second portion of antenna elements 118B may be controlled and adjusted as a group by the base station 112 using the controller, independent of the first portion of antenna elements 118A. Accordingly, the base station 112 may use a controller to independently adjust different groups or portions of antenna elements within one antenna array.

In embodiments, the operations, configurations, and/or settings of each individual antenna element of the first and second portions of antenna elements 118A and 118B may be adjusted and customized. For example, the base station 112 instructs the first portion of antenna elements 118A to transmit one or more synchronization signals using a first periodicity. In another example, the first portion of antenna elements 118A may transmit a first plurality of synchronization signals using a first periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

The base station 112 may use the controller to determine a quantity of RLFs that occurred, in some embodiments. For example, the base station 112 may determine a quantity of RLFs occurring over a defined period of time, e.g., 100 RLFs per minute, 5 RLFs per 20 milliseconds. In various embodiments, the base station 112 may monitor a total quantity of RLFs occurring over a period of time (e.g., 24 hours, 1 hour, 5 minutes, 30 seconds) and/or a rate of RLFs of UE that are connected to the network 102 at the base station 112 using the first access technology and/or the second access technology. In some embodiments, the base station 112 may monitor and/or measure the quantity and/or rate of RLFs of UE which are capable of utilizing the first access technology (e.g., current UE via 5G). The base station 112 may, in some embodiments, determine a quantity of RLFs that are associated with or correspond to synchronization signal failures of one or more UE that are capable of using the first access technology. When one or more UE experience one or more RLFs, the RLFs may indicate that the UE are unable to and/or cannot connect to the network 102 using the first access technology. For example, when one or more UE that are capable of using 5G experience one or more RLFs based on a failure of the one or more UE to detect synchronization signals transmitted over 5G, the RLFs indicate that the 5G-capable UE are unable to and/or cannot connect to the network 102 using 5G. Generally, the RLFs may be communicated to the base station by one or more UE and/or a neighboring base station, in some embodiments.

In embodiments, when a quantity of RLFs meets a predefined threshold, the base station 112 may change the periodicity of the synchronization signals that are transmitted, e.g., from a first periodicity of 20 millisecond repeats to a second periodicity of 10 millisecond repeats. The threshold quantity may be a predefined value (e.g., integer) set by a network operator. Based on the quantity, rate, and/or rate of RLFs occurring for UE that are first access technology capable, the base station 112 may determine to change the periodicity of the synchronization signals that are subsequently transmitted (e.g., in order to reduce the total quantity and/or rate of RLFs). In some embodiments, the quantity and/or rate of RLFs used by the base station 112 to make a determination to change periodicity may result from, correspond to, and/or be specific to synchronization signal detection failures for the first access technology and/or UE that are capable of utilizing the first access technology (e.g., a failure to detect one or more SS blocks). For example, the RLFs used by the base station 112 to make a periodicity change determination may be specific to those UE that are capable of using the first access technology, as opposed to legacy UE that are not capable of using the first access technology. In one example, the base station 112 may determine to change SS block periodicity when the quantity and/or rate of RLFs that are specifically occurring due to synchronization signal detection failures of first access technology UE meets or exceeds a network operator-defined threshold. Accordingly, RLFs occurring for UE that are not capable of utilizing the first access technology may be disregarded by the base station 112 for the purposes of determining periodicity changes for the first access technology.

Based on the quantity, rate, and/or "type" (e.g., specific to SS Block detection failure and/or specific to 5G-capable UE) of RLFs relative to the threshold, and the base station 112 making a determination to change the periodicity of synchronization signals for the first access technology, the base station 112 may identify, dynamically determine, and/or select a new value for the periodicity to implement and use for subsequently transmitting synchronization signals from the first portion of antenna elements 118A that are associated with the first access technology, in embodiments. Accordingly, the base station 112 may determine that the current or existing "first" periodicity from which the RLFs resulted may be changed to a new "second" periodicity. In embodiments, the second periodicity is less than the first periodicity, meaning that the duration of the time interval between repeating synchronization signals of the second periodicity is shorter than the duration of the time interval between the repeating synchronization signals of the first periodicity. In one example, the first periodicity is a duration of a 20 millisecond time interval that lapses between transmissions of synchronization signals and the second periodicity is a duration of a less than 20 millisecond time interval that lapses between transmissions of synchronization signals. In another example, the first periodicity is at least 20 milliseconds and the second periodicity is 10 milliseconds. By shortening the periodicity to increase the repeated transmissions of first access technology specific synchronization signals, first access technology capable UE are provided more opportunities to detect the first access technology specific synchronization signals. This is predicted to decrease the quantity and/or rate of RLFs, in embodiments. It will be understood that decreasing the time interval or otherwise shortening the periodicity results in an increase in the number of resource blocks that are assigned to the transmission of the synchronization signals. As such, using the second periodicity to transmit synchronization signals every n number of resource blocks (e.g., to repeat every n number of resource blocks) results in the overall number of resource blocks used for the second periodicity to be greater than the overall number of resource blocks used when implementing the first periodicity.

The base station 112 may use the first periodicity to identify, dynamically determine, and/or select the second periodicity, in various embodiments. In some embodiments, the base station 112 determines the new periodicity by reducing the existing periodicity by an integer n. For example, the second periodicity is determined by reducing the first periodicity of 20 milliseconds by 4 milliseconds, where the second periodicity is 16 milliseconds. In another example, the second periodicity is determined by reducing the first periodicity of 20 milliseconds by 7 milliseconds, where the second periodicity is 13 milliseconds. In yet another example, the second periodicity is determined by reducing the first periodicity of 20 milliseconds by 5 milliseconds, where the second periodicity is 15 milliseconds. In various embodiments, n may be a fixed or default value.

In some embodiments, the base station 112 determines the second periodicity by referencing a table or index that specifies a value. The second periodicity may be a fixed value that is independent of the first periodicity in the table, or the second periodicity may be a value that can be looked up by the base station 112 using the first periodicity. For example, the base station may reference network operator defined values stored in an index that indicate a second periodicity is 15 milliseconds when the first periodicity is 20 milliseconds.

Additionally or alternatively, in some embodiments, the base station 112 determines that the second periodicity that is less than the first periodicity based on one or more of the determined quantity of RLFs, the rate of RLFs, one or more radio frequency conditions at the cell site, and/or a total quantity of first access technology capable UE at the cell site. In one example, when the base station 112 determines that there are 150 UE capable of using the first access technology, the base station 112 may determine to change from the first periodicity of 20 milliseconds to a second periodicity of 10 milliseconds. In another example, when the base station 112 determines that there are 20 UE capable of using the first access technology, the base station 112 may determine to change from the first periodicity of 20 milliseconds to a second periodicity of 16 milliseconds. In yet another example, when the base station 112 determines that there are five UE capable of using the first access technology, the base station 112 may determine to change from the first periodicity of 20 milliseconds to a second periodicity of 18 milliseconds. In various embodiments, the quantity of resource blocks, the duration of the time interval, or "amount" by which the first periodicity is lessened, shortened, or reduced by the base station in order to generate the second periodicity may be proportionate to the quantity of UE that are capable of utilizing the first access technology at the cell site, as assessed by the base station 112 at the time of, within a predefined time period of (i.e., near in time), or concurrently with the determination of the quantity of RLFs (e.g., as the quantity of UE increases at the cell site with RLFs that meet the threshold, the reduction from the first periodicity to the second periodicity is increased by the base station 112, wherein the SS blocks are repeated more frequently). Alternatively, the quantity of resource blocks, the duration of the time interval, or "amount" by which the first periodicity is lessened, shortened, or reduced by the base station in order to generate the second periodicity may not proportionate to the quantity of UE that are capable of utilizing the first access technology at the cell site (e.g., may be a fixed, static value), in some embodiments.

Once the base station 112 has identified, dynamically determined, and/or selected the second periodicity, the base station 112 may adjust the periodicity of subsequently transmitted synchronization signals (e.g., SS Block) permanently, transiently, or for a predetermined period of time (e.g., 5 minutes, 1 day, 1 month, 1 year). The predetermined period of time may be defined by a network operator or may be a default value. In embodiments, the periodicity of synchronization signals transmitted from the first portion of antenna elements 118A that are associated with the first access technology may be changed from the first periodicity to the second periodicity by the base station 112, while the base station 112 concurrently maintains (i.e., does not adjust) the periodicity of synchronization signals transmitted from the second portion of antenna elements 118B that are associated with the second access technology.

Figure 3:
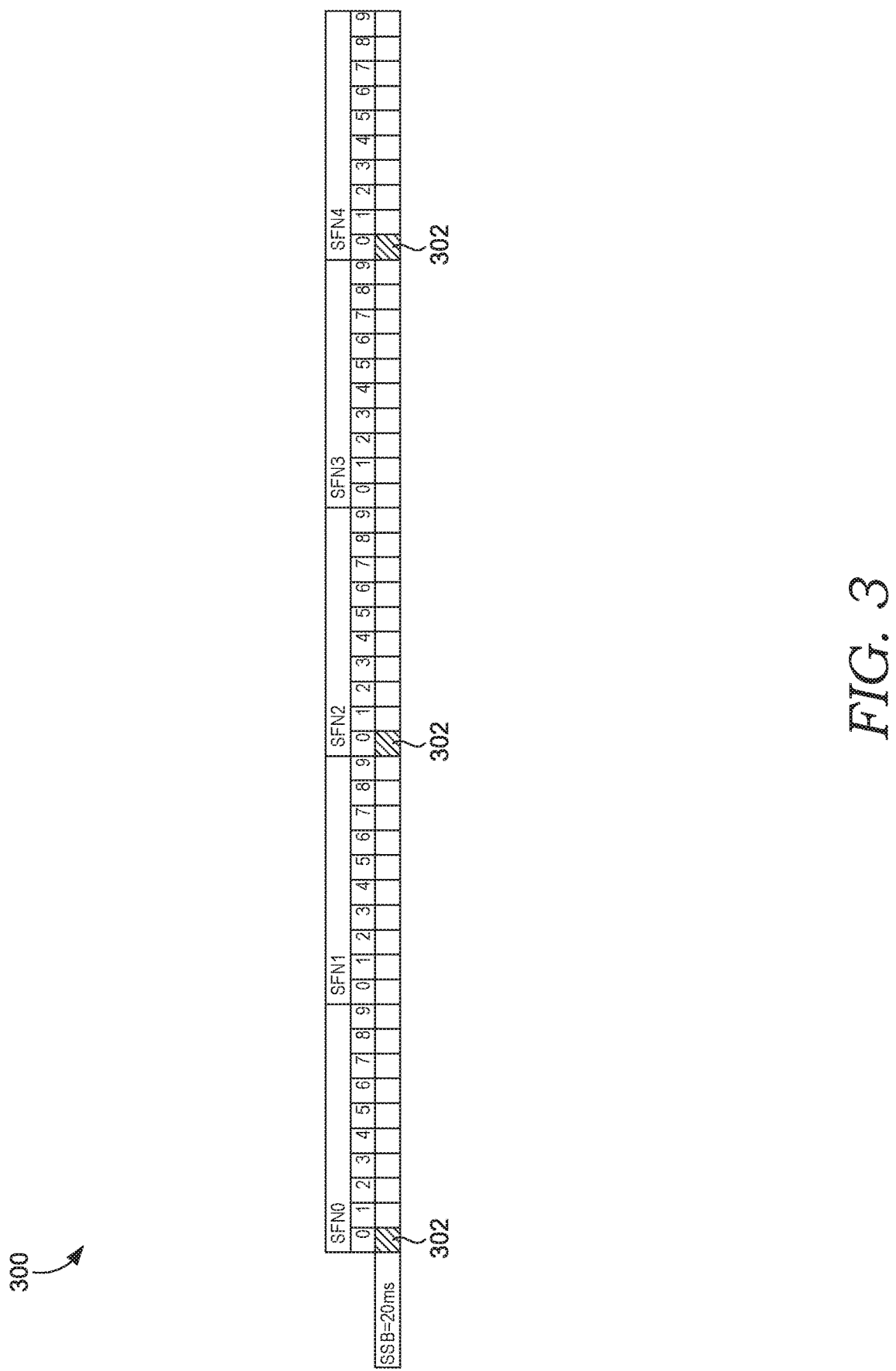
FIG. 3 depicts an example of a timing interval for synchronization signal blocks using a first periodicity in accordance with one or more embodiments.
Figure 4:
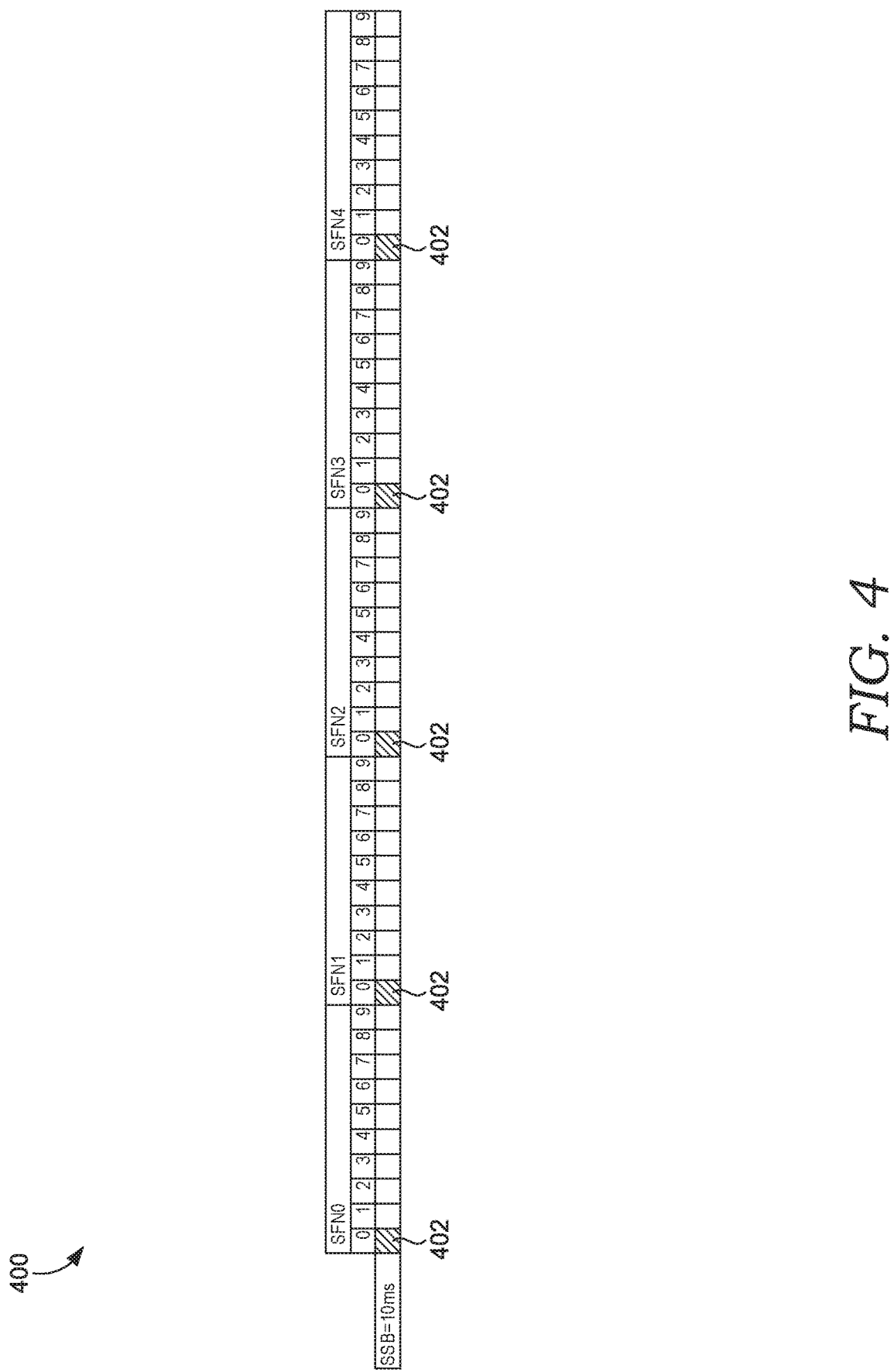
FIG. 4 depicts an example of a timing interval for synchronization signal blocks using a second periodicity in accordance with one or more embodiments.

For example, FIG. 3 illustrates an example 300 of a defined timing interval for synchronization signal blocks 302 in accordance with one or more embodiments for wireless transmissions. In FIG. 3, one or more synchronization signals 302, such as an SS Block, may be transmitted using the first periodicity. As shown in FIG. 3, resource blocks are assigned or dedicated to the one or more synchronization signals in a repeating manner. The one or more synchronization signals 302 may repeat at an interval of 20 milliseconds between transmissions of the one or more synchronization signals 302. FIG. 4 illustrates an example 400 of a defined timing interval for synchronization signal blocks 400 for wireless transmissions. In FIG. 4, one or more additional synchronization signals 402, such as an SS Block, may be transmitted using the second periodicity. As shown in FIG. 4, resource blocks are assigned or dedicated to the one or more additional synchronization signals 402 in a repeating manner having the second periodicity. As shown in FIG. 4, the second periodicity is shortened or less than the first periodicity, and the one or more additional synchronization signals 402 may repeat at an interval of 10 milliseconds. It will be understood that FIGS. 3 and 4 are merely examples and the values of 20 and 10 milliseconds should not be construed as limiting.

Subsequent to changing over to the second periodicity and transmitting one or more additional synchronization signals using the second periodicity, the base station 112 may monitor a quantity and/or a rate of RLFs associated with the UE that are capable of utilizing the first access technology, in embodiments. As such, one or more RLFs that occur after one or more additional synchronization signals are transmitted using the second periodicity can be measured and monitored to determine whether using the second periodicity reduced the quantity and/or rate of RLFs relative to the previously-determined quantity and/or rate of the RLFs that occurred when using the first periodicity to send one or more synchronization signals. The base station 112 may also monitor the total quantity of the UE capable of utilizing the first access technology at the cell site subsequent to changing over to the second periodicity and transmitting one or more additional synchronization signals using the second periodicity, in some embodiments.

In some embodiments, after implementation of the second periodicity, the base station 112 may determine whether the quantity and/or rate of RLFs resulting from synchronization signal detection failures for UE that are capable of using the first access technology meets the predefined threshold. In some embodiments, the same predefined threshold is used to evaluate RLFs for the first periodicity and the second periodicity. Alternatively, a first predefined threshold may be used to evaluate RLFs for the first periodicity while a different, second predefined threshold may be used to evaluate RLFs for the second periodicity. For example, a first predefined threshold of 50 or more RLFs may be used to evaluate problematic or poor 5G on-loading using the first periodicity and to trigger a change in periodicity, while a different second predefined threshold of 10 or fewer RLFs may be used to evaluate whether sufficient acceptable on-loading is achieved by implementing and using the second periodicity. In some embodiments, after implementation of the second periodicity, the base station 112 may determine that the quantity and/or rate of RLFs resulting from synchronization signal detection failures for UE that are capable of using the first access technology meets the predefined threshold.

Based on the determination that the predefined threshold is met for the second periodicity, the base station 112 may determine to change the second periodicity to a different third periodicity, in embodiments. In some embodiments, the third periodicity is a time interval having a duration that is less than a duration of the second periodicity. For example, the second periodicity of 10 milliseconds may be replaced with the third periodicity that is 5 milliseconds. In other words, the duration of the time interval between repeating synchronization signals of the third periodicity is shorter than the duration of the time interval between the repeating synchronization signals of the second periodicity. One SS block can be subsequently transmitted every 5 milliseconds, in such an example. By increasing the rate at which synchronization signals repeat (i.e., shortening the duration of a time interval between synchronization signal transmissions, thus reducing periodicity), the base station 112 provides one or more UE an increased number of opportunities and/or more frequent opportunities to detect synchronization signals. Based on the increased number of opportunities and/or more frequent opportunities available for detection of synchronization signals, the UE may more quickly connect to the network using the first access technology. The monitoring of RLFs and resetting or adjusting the periodicity used by the base station 112 to transmit synchronization signals may be repeated iteratively, in further embodiments. For example, the monitoring of RLFs and resetting or adjusting the periodicity used by the base station 112 to transmit synchronization signals may be repeated iteratively until the RLFs measured do not meet the predefined threshold.

Additional criteria may be considered when adjusting from one periodicity to another periodicity, either individually or together in any combination, including an increased number of UE (e.g., relative to a network operator defined UE-quantity threshold) that are capable of using the first access technology at the cell site, high loading (e.g., relative to a network operator defined loading threshold) of the UE that are capable of using the first access technology at the cell site, and/or radio frequency conditions of UE (e.g., relative to a network operator defined radio frequency condition-specific threshold(s)) that are capable of using the first access technology.

Having described the network environment 100 and components operating therein, it will be understood by those of ordinary skill in the art that the network environment 100 is but one example of a suitable network and is not intended to limit the scope of use or functionality of the present invention. Similarly, the network environment 100 should not be interpreted as imputing any dependency and/or any requirements with regard to each component and combination(s) of components illustrated in FIGS. 1 through 4. It will be appreciated by those of ordinary skill in the art that the number, interactions, and physical location of components illustrated in FIGS. 1 through 4 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIGS. 1 through 4 for simplicity's sake. As such, the absence of components from FIGS. 1 through 4 should not be interpreted as limiting the present invention to exclude additional components and combination(s) of components. Moreover, though components may be represented as singular components or may be represented in a particular quantity in FIGS. 1 through 4, it will be appreciated that some embodiments may include a plurality of devices and/or components such that FIGS. 1 through 4 should not be considered as limiting the quantity of any device and/or component.

Methods

Having described the network environment 100, methods are discussed that can be performed within the network environment 100 and using the components discussed in FIGS. 1 through 4. The methods are discussed with brevity to avoid redundancy with the previous sections, and further incorporate aspects previously described with regard to FIGS. 1 through 4.

Figure 5:
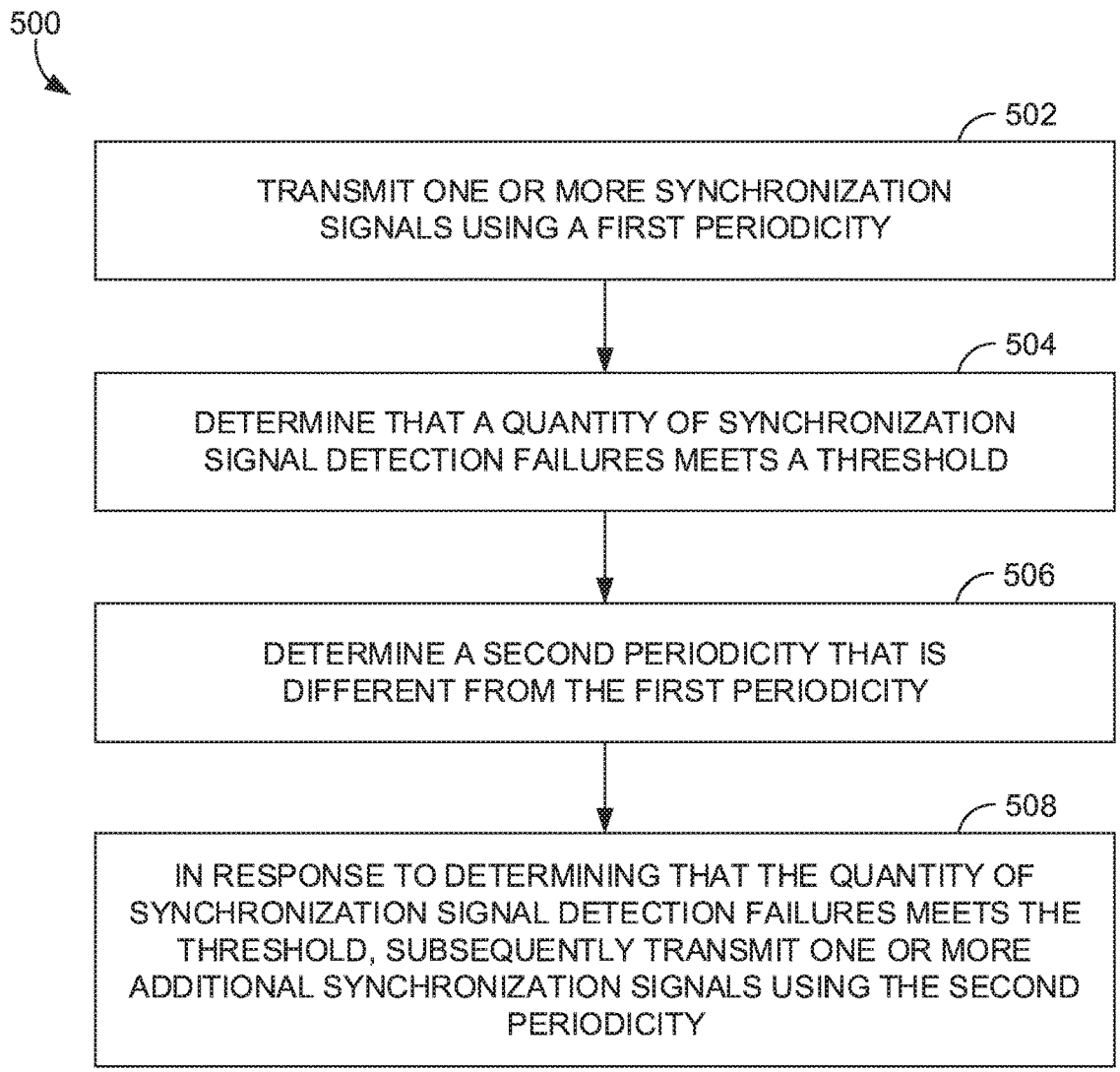
FIG. 5 illustrates an example method for optimizing a user experience based on periodicity modifications, in accordance with one or more embodiments.
Figure 6:
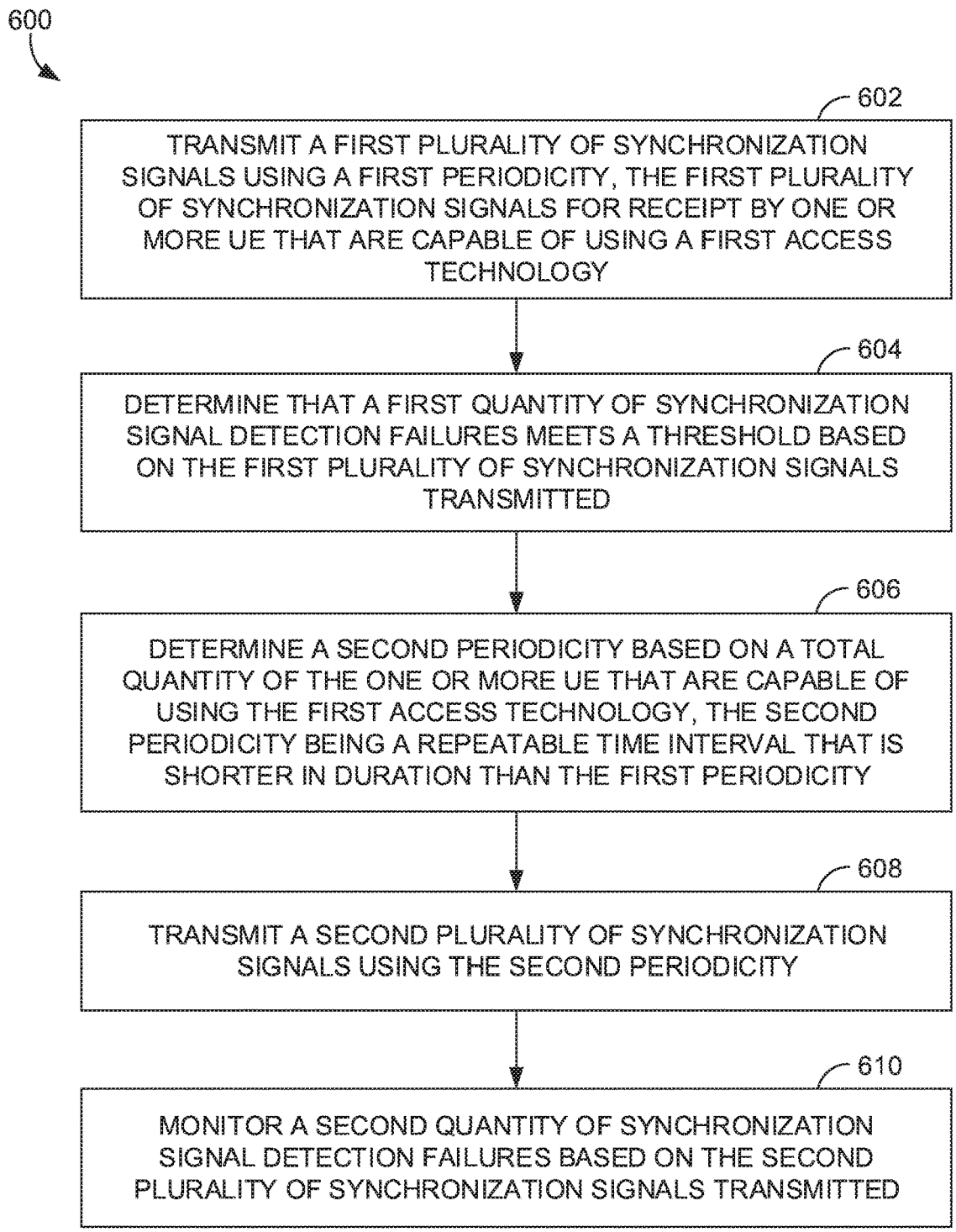
FIG. 6 illustrates another example method for optimizing a user experience based on periodicity modifications, in accordance with one or more embodiments.

FIGS. 5 and 6 illustrate examples of methods that may be performed via one or more of the components and component interactions previously described in FIGS. 1 through 4. As such, the methods are discussed briefly, though it will be understood that the previous discussion and details may be applicable to aspects of the methods of FIGS. 5 and 6. Additionally or alternatively, it will be understood that the methods discussed herein can be implemented or performed via the execution of computer-readable instructions stored on computer readable media, by one or more processors, such as hardware processors. For example, the methods discussed herein may be accomplished using computer-readable storage media (e.g., non-transitory) having computer-executable instructions embodied thereon that, when executed by one or more processors, cause the processors to perform the methods. Further, it will be understood that the methods herein may be performed for a single cell site, or further, may be performed for each of a plurality of cell sites. As such, in various embodiments, the methods are discussed herein with respect to one cell site, such as a cell site that comprises an EN-DC antenna that concurrently provides network access through a first and second access technology. However, it will be understood that the methods may be iteratively repeated for a plurality of antennas and a plurality of cells sites across a global network.

FIG. 5 provides an example of a method 500 of optimizing a user experience based on periodicity modifications in accordance with embodiments herein. In embodiments, the method 500 is performed at a base station, for example, such as the base station 112 of FIG. 1. In some embodiments, the base station is associated with a cell site that includes an EN-DC antenna array, wherein the EN-DC antenna concurrently provides concurrent network access through both a first and second access technology. As such, the base station may control the EN-DC antenna array having a plurality of antenna elements, wherein a first subset of antenna elements are dedicated to a first access technology and a second subset of antenna elements are dedicated to a second access technology. It will be understood from this Description that the method 500 may be performed, continually or periodically, for a plurality of sectors and across a plurality of cell sites. Additionally, the method 500 may be performed, continually or periodically, for each of a plurality of cell sites, across a global network.

At block 502, one or more synchronization signals are transmitted using a first periodicity. For example, one or more synchronization signals are transmitted using a first periodicity of 20 millisecond time intervals between transmissions of the one or more synchronization signals. In another example, an SS Block is transmitted every 20 milliseconds (i.e., using a first periodicity). A quantity of synchronization signal detection failures is determined to meet a threshold, at block 504. The quality of synchronization signal failures may be only any scale. The quantity of synchronization signal detection failures is determined based on one or more radio link failures of one or more UE, in some embodiments. In some embodiments, therefore, one or more radio link failures may be identified to have occurred for one or more 5G-capable UE based on a failure of the one or more 5G-capable UE to detect at least one of the one or more synchronization signals transmitted using the first periodicity. In an embodiment, the one or more UE are 5G-capable devices, such that the method is specifically examining the RLFs of 5G-capable devices.

Shown at block 506, a second periodicity that is different from the first periodicity is determined. In some embodiments, the second periodicity may be determined based on the quantity of synchronization signal detection failures, wherein the quantity of synchronization signal failures is monitored relative to the threshold prior to modifying the existing periodicity. Generally, the first periodicity is a lengthier time duration or greater time interval than the second periodicity. For example, when the first periodicity is a reoccurring time interval of n milliseconds, the second periodicity may be another reoccurring time interval of n-1 milliseconds. In one embodiment, the second periodicity is less than 10 milliseconds. In another embodiment, the first periodicity is greater than the second periodicity and the second periodicity is less than 15 milliseconds. In yet another embodiment, the first periodicity is greater than the second periodicity and the second periodicity is less than 20 milliseconds.

In response to determining that the quantity of synchronization signal detection failures meets the threshold, one or more additional synchronization signals are subsequently transmitted using the second periodicity, as shown at block 508. In further embodiments, the quantity of synchronization signal detection failures is monitored relative to the threshold subsequent to modifying the existing periodicity. The quantity of synchronization signal detection failures after implementing the second periodicity may be monitored in near real-time, continuously, or periodically, in various embodiments. Based on the quantity of synchronization signal detection failures occurring after implementation of the second periodicity, the periodicity may be adjusted further, as previously discussed herein, one time or many times, in order to optimize the user experience to reduce and/or minimize RLFs based on synchronization signal detection failures experienced by UE that are capable of using the first access technology.

FIG. 6 provides an example of a method 600 of optimizing a user experience based on periodicity modifications in accordance with embodiments herein. In embodiments, the method 600 is performed at a base station, for example, such as the base station 112 of FIG. 1. In some embodiments, the base station is associated with a cell site that includes an EN-DC antenna array, wherein the EN-DC antenna concurrently provides concurrent network access through both a first and second access technology. As such, the base station may control the EN-DC antenna array having a plurality of antenna elements, wherein a first subset of antenna elements are dedicated to a first access technology and a second subset of antenna elements are dedicated to a second access technology. It will be understood from this Description that the method 600 may be performed, continually or periodically, for a plurality of sectors and across a plurality of cell sites. Additionally, the method 600 may be performed, continually or periodically, for each of a plurality of sectors within each of a plurality of cell sites, across a global network.

At block 602, a first plurality of synchronization signals are transmitted using a first periodicity, wherein the plurality of synchronization signals are configured for receipt by one or more UE that are capable of using a first access technology. Shown at block 604, a first quantity of synchronization signal detection failures are determined to meet a threshold based on the first plurality of synchronization signals transmitted. In embodiments, a base station may identify a plurality of radio link failures occurring for one or more UE that are capable of using a first access technology. Then, the base station may determine that at least one of the plurality of radio link failures corresponds to one or more of the first quantity of synchronization signal detection failures by at least one of the one or more UE, in embodiments. Based on identifying the RLFs that specifically correspond to synchronization signal failures, the base station may determine whether these type of RLFs meet the threshold. For example, the first quantity of synchronization signal detection failures for the first plurality of synchronization signals transmitted may be determined based on one or more radio link failures of the one or more UE that are capable of using a first access technology.

A second periodicity is determined at block 606, based on a total quantity of the one or more UE that are capable of using the first access technology, wherein the second periodicity is a repeatable time interval that is shorter in duration than the first periodicity. In some embodiments, the second periodicity may be determined by reducing the first periodicity by a predetermined amount (e.g., network operator defined or default) or by referencing a default repeatable time interval, as previously discussed herein. In embodiments, the second periodicity may be determined based on loading of the first access technology. Additionally or alternatively, the second periodicity may be further determined based on a radio frequency condition of the first access technology.

At block 608, a second plurality of synchronization signals are transmitted using the second periodicity. Further, a second quantity of synchronization signal detection failures may be monitored based on the second plurality of synchronization signals transmitted, shown at block 610. In further embodiments, a second quantity of synchronization signal detection failures for the second plurality of synchronization signals transmitted may be determined to be less than the threshold. In one such embodiment, the second periodicity for the first access technology may be maintained in response to the determination that the second quantity of synchronization signal detection failures for the second plurality of synchronization signals transmitted is less than the threshold.

In another embodiment, a second quantity of synchronization signal detection failures for the second plurality of synchronization signals transmitted is determined to meet the threshold. In one such embodiment, a third periodicity may be determined when the second quantity of synchronization signal detection failures for the second plurality of synchronization signals transmitted meets the threshold. The third periodicity may be a repeatable time interval that is shorter in duration than the second periodicity, in such embodiments. Further, in embodiments, a third plurality of synchronization signals may be transmitted using the third periodicity. Then, in embodiments, a third quantity of synchronization signal detection failures may be monitored based on the third plurality of synchronization signals transmitted. In some embodiments, the third quantity of synchronization signal detection failures for the third plurality of synchronization signals transmitted is determined to be less than the threshold. The third periodicity for the first access technology may be maintained in response to the determination that the third quantity of synchronization signal detection failures for the third plurality of synchronization signals transmitted is less than the threshold.

Figure 7:
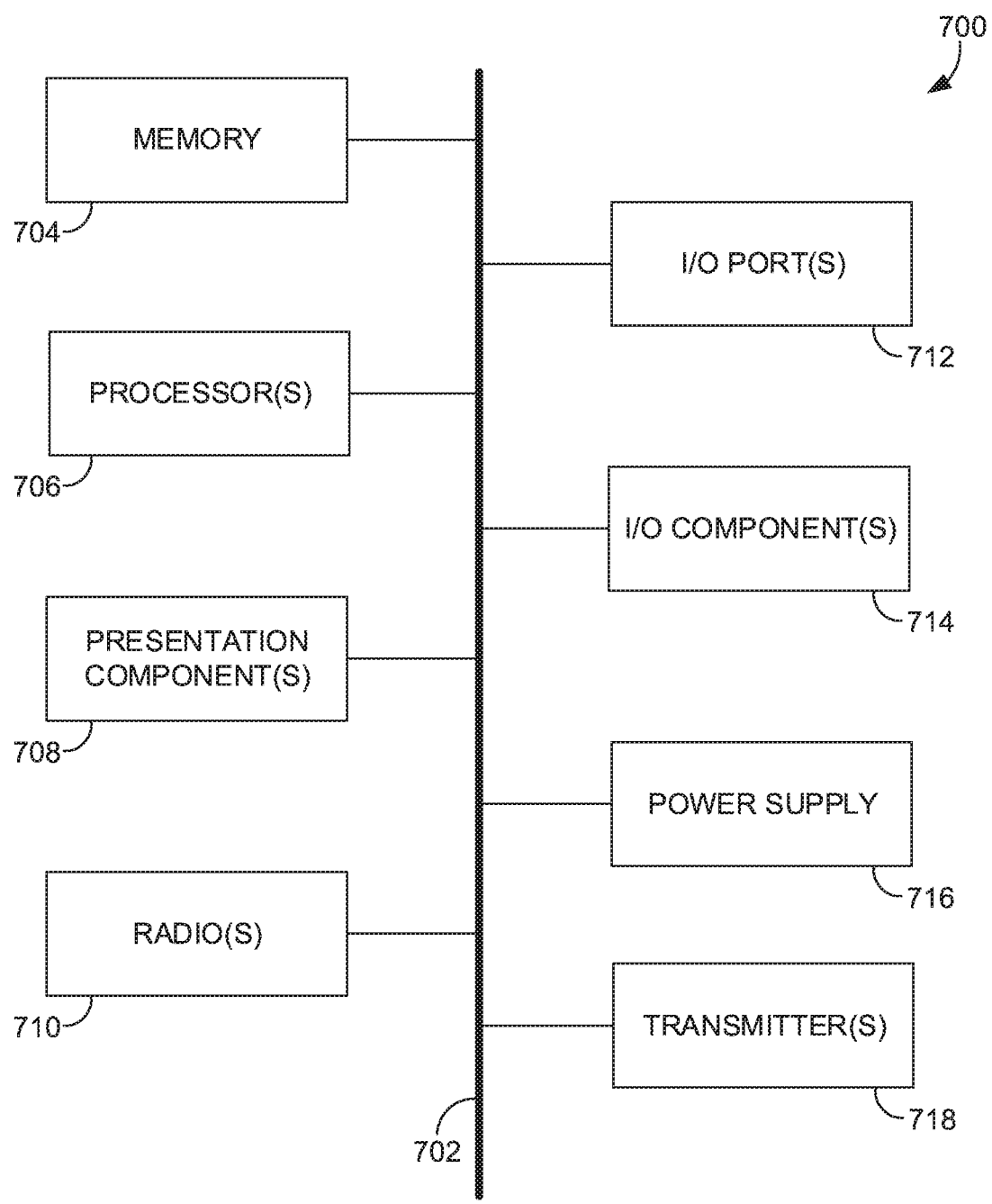
FIG. 7 depicts an example computing device suitable for use in implementations of the present disclosure.

Referring to FIG. 7, a block diagram of an example of a computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated. In aspects, the computing device 700 may be a base station. In another embodiment, the computing device 700 may be UE capable of two-way wireless communications with an access point. Some non-limiting examples of the computing device 700 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 702 that directly or indirectly couples various components together. The bus 702 may directly or indirectly one or more of memory 704, processor(s) 706, presentation component(s) 708 (if applicable), radio(s) 710, input/output (I/O) port(s) 712, input/output (I/O) component(s) 714, power supply 716, and/or transmitter(s) 718. Although the components of FIG. 7 are shown with lines for the sake of clarity, in reality, delineating various components is not so clear, and metaphorically, the lines would more accurately be grey and fuzzy. For example, one may consider a presentation component(s) 708 such as a display device to be one of I/O components 714. Also, the processor(s) 706 may include memory 704, in another example. The present disclosure hereof recognizes that such is the nature of the art, and reiterates that FIG. 7 is merely illustrative of an example of a computing device 700 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 704 may take the form of memory components described herein. Thus, further elaboration will not be provided here, but it should be noted that memory 704 may include any type of tangible medium that is capable of storing information, such as a database or data store. A database or data store may be any collection of records, files, or information encoded as electronic data and stored in memory 704, for example. In one embodiment, memory 704 may include a set of embodied computer-readable and executable instructions that, when executed, facilitate various functions or elements disclosed herein. These embodied instructions will variously be referred to as "instructions" or an "application" for short.

Processor(s) 706 may be multiple processors that receive instructions and process them accordingly. Presentation component(s) 708, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 710 represents one or more radios that facilitate communication with a wireless telecommunications network. For example, radio(s) 710 may be connected to one or more antenna elements through a physical path. Illustrative wireless telecommunications technologies include CDMA, GPRS, TDMA, GSM, and the like. Radio(s) 710 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 710 can be configured to concurrently support multiple technologies, as previously discussed herein. As such, each of many radio(s) 710 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 712 may take a variety of forms. Exemplary I/O ports 712 may include a USB jack, a stereo jack, an infrared port, a firewire port, other proprietary communications ports, and the like. Input/output (I/O) components 714 may comprise keyboards, microphones, speakers, touchscreens, and/or any other item usable to directly or indirectly input data into the computing device 700.

Power supply 716 may include batteries, fuel cells, and/or any other component that may act as a power source to supply power to the computing device 700 or to other network components, including through one or more electrical connections or couplings. Power supply 716 may be configured to selectively supply power to different components independently and/or concurrently.

Finally, regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that embodiments of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/ or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of optimizing a user experience based on periodicity modifications, the method comprising:
   transmitting one or more synchronization signals using a first periodicity;
   determining that a quantity of synchronization signal detection failures meets a threshold;
   determining a second periodicity that is different from the first periodicity; and
   in response to determining that the quantity of synchronization signal detection failures meets the threshold, subsequently transmitting one or more additional synchronization signals using the second periodicity.

2. The method of claim 1, wherein the quantity of synchronization signal detection failures is determined based on one or more radio link failures of one or more UE.

3. The method of claim 2, wherein the one or more UE are 5G-capable devices.

4. The method of claim 1, wherein the first periodicity is greater than the second periodicity, and wherein the second periodicity is less than 10 milliseconds.

5. The method of claim 1, wherein the first periodicity is greater than the second periodicity, and wherein the second periodicity is less than 15 milliseconds.

6. The method of claim 1, wherein the first periodicity is greater than the second periodicity, and wherein the second periodicity is less than 20 milliseconds.

7. The method of claim 1, wherein the quantity of synchronization signal detection failures is monitored relative to the threshold prior to modifying the first periodicity.

8. The method of claim 1, wherein the quantity of synchronization signal detection failures is monitored relative to the threshold subsequent to modifying the first periodicity.

9. The method of claim 1, further comprising identifying one or more radio link failures have occurred for one or more 5G-capable UE based on a failure of the one or more 5G-capable UE to detect at least one of the one or more synchronization signals transmitted using the first periodicity.

10. Computer-readable storage media having computer-executable instructions embodied thereon that, when executed by one or more processors, cause the processors to:
  transmit a first plurality of synchronization signals using a first periodicity, the first plurality of synchronization signals for receipt by one or more UE that are capable of using a first access technology;
  determine that a first quantity of synchronization signal detection failures meets a threshold based on the first plurality of synchronization signals transmitted;
  determine a second periodicity based on a total quantity of the one or more UE that are capable of using the first access technology, the second periodicity being a repeatable time interval that is shorter in duration than the first periodicity;
  transmit a second plurality of synchronization signals using the second periodicity; and
  monitor a second quantity of synchronization signal detection failures based on the second plurality of synchronization signals transmitted.

11. The media of claim 10, wherein the first quantity of synchronization signal detection failures for the first plurality of synchronization signals transmitted is determined based on one or more radio link failures of the one or more UE that are capable of using the first access technology.

12. The media of claim 10, wherein the second periodicity is further determined based on loading of the first access technology.

13. The media of claim 10, wherein the second periodicity is further determined based on a radio frequency condition of the first access technology.

14. The media of claim 10, wherein the second periodicity is determined by reducing the first periodicity by a predetermined amount or by referencing a default repeatable time interval.

15. The media of claim 10, further causing the one or more processors to:
  identify a plurality of radio link failures occurring for the one or more UE that are capable of using the first access technology; and
  determine that at least one of the plurality of radio link failures corresponds to one or more of the first quantity of synchronization signal detection failures by at least one of the one or more UE.

16. The media of claim 10, further causing the one or more processors to:
  determine that the second quantity of synchronization signal detection failures for the second plurality of synchronization signals transmitted is less than the threshold; and
  maintain the second periodicity for the first access technology in response to the determination that the second quantity of synchronization signal detection failures for the second plurality of synchronization signals transmitted is less than the threshold.

17. The media of claim 10, further causing the one or more processors to:
  determine that the second quantity of synchronization signal detection failures for the second plurality of synchronization signals transmitted meets the threshold;
  determine a third periodicity when the second quantity of synchronization signal detection failures for the second plurality of synchronization signals transmitted meets the threshold, the third periodicity being another repeatable time interval that is shorter in duration than the second periodicity;
  transmit a third plurality of synchronization signals using the third periodicity; and
  monitor a third quantity of synchronization signal detection failures based on the third plurality of synchronization signals transmitted.

18. The media of claim 17, further causing the one or more processors to:
  determine that the third quantity of synchronization signal detection failures for the third plurality of synchronization signals transmitted is less than the threshold; and
  maintain the third periodicity for the first access technology in response to the determination that the third quantity of synchronization signal detection failures for the third plurality of synchronization signals transmitted is less than the threshold.

19. The media of claim 10, wherein the first and second plurality of synchronization signals are transmitted from a cell site, the cell site comprising an EN-DC antenna that concurrently provides network access through the first access technology and a second access technology, wherein the EN-DC antenna includes a plurality of antenna elements, wherein the plurality of antenna elements comprises a first subset of antenna elements that are dedicated to the first access technology, and wherein the plurality of antenna elements comprises a second subset of antenna elements that are dedicated to the second access technology.

20. A system comprising:
  one or more hardware processors that:
  transmit a first plurality of synchronization signals using a first periodicity, the first plurality of synchronization signals for receipt by one or more UE that are capable of using a first access technology;
  determine that a first quantity of synchronization signal detection failures meets a threshold based on the first plurality of synchronization signals transmitted;
  determine a second periodicity based on a total quantity of the one or more UE that are capable of using the first access technology, the second periodicity being a repeatable time interval that is shorter in duration than the first periodicity;
  transmit a second plurality of synchronization signals using the second periodicity; and
  monitor a second quantity of synchronization signal detection failures based on the second plurality of synchronization signals transmitted.

* * * * *